(12) United States Patent
Comerford et al.

(10) Patent No.: US 10,332,143 B2
(45) Date of Patent: Jun. 25, 2019

(54) SYSTEMS, METHODS AND COMPUTER READABLE MEDIUM FOR WIRELESS SOLICITATIONS

(71) Applicant: Capital One Services, LLC, McLean, VA (US)

(72) Inventors: Richard Comerford, Glen Allen, VA (US); Joseph M. DeFilippo, Glen Allen, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 299 days.

(21) Appl. No.: 14/298,288

(22) Filed: Jun. 6, 2014

(65) Prior Publication Data

US 2014/0289031 A1  Sep. 25, 2014

Related U.S. Application Data

(63) Continuation of application No. 11/003,367, filed on Dec. 6, 2004, now Pat. No. 8,775,253.

(51) Int. Cl.
| | |
|---|---|
| *G06Q 30/00* | (2012.01) |
| *G06Q 30/02* | (2012.01) |
| *H04M 3/493* | (2006.01) |
| *H04M 3/38* | (2006.01) |
| *H04M 3/487* | (2006.01) |

(52) U.S. Cl.
CPC ......... *G06Q 30/0215* (2013.01); *G06Q 30/02* (2013.01); *G06Q 30/0224* (2013.01); *G06Q 30/0235* (2013.01); *H04M 3/493* (2013.01); *H04M 3/382* (2013.01); *H04M 3/4878* (2013.01); *H04M 2242/30* (2013.01)

(58) Field of Classification Search
CPC .................................................. G06Q 30/0235
USPC ........................................................... 705/14
See application file for complete search history.

(56) References Cited

U.S. PATENT DOCUMENTS

| | | | |
|---|---|---|---|
| 6,647,269 B2 | 11/2003 | Hendrey et al. | |
| 7,356,506 B2 | 4/2008 | Watson et al. | |

(Continued)

FOREIGN PATENT DOCUMENTS

| | | | | |
|---|---|---|---|---|
| EP | 971302 A1 | * | 1/2000 | ............ G06F 17/60 |

*Primary Examiner* — Matthew L Hamilton
(74) *Attorney, Agent, or Firm* — Finnegan, Henderson, Farabow, Garrett & Dunner LLP

(57) ABSTRACT

Product offering systems are provided. Product offering systems may include sending an offer to a customer that possesses a mobile computing device and has agreed to receive offers for products via the mobile computing device. Agreeing to receive offers would result in the unique data about the customer being available to offer provider. Unique customer data may include data related to the customers wireless service provider or from a financial account in a financial institution, and collecting customer data about the customer, wherein the customer data comprises financial data and personal data. Product offering systems may further include registering a wireless computing device of the customer to able the device to receive the offer, and determining opportunities to send the offer to the customer by monitoring the customer and the customer data. Product offering systems may also include sending the offer to the customer's registered device based on the determination of opportunities.

21 Claims, 7 Drawing Sheets

(56) References Cited

U.S. PATENT DOCUMENTS

| | | | |
|---|---|---|---|
| 8,930,271 B1* | 1/2015 | Ellis | G06Q 30/0224 705/41 |
| 2001/0032193 A1 | 10/2001 | Ferber | |
| 2002/0095337 A1* | 7/2002 | Velthuis | G06Q 30/02 705/14.39 |
| 2002/0102975 A1 | 8/2002 | Allen | |
| 2002/0109598 A1 | 8/2002 | Allen | |
| 2002/0115449 A1 | 8/2002 | Allen | |
| 2002/0161640 A1* | 10/2002 | Wolfe | G06Q 30/02 705/14.23 |
| 2002/0186133 A1* | 12/2002 | Loof | 340/572.1 |
| 2003/0028518 A1* | 2/2003 | Mankoff | 707/1 |
| 2003/0033231 A1 | 2/2003 | Turner et al. | |
| 2003/0046157 A1 | 3/2003 | Prorock | |
| 2003/0061110 A1 | 3/2003 | Bodin | |
| 2003/0135442 A1 | 7/2003 | Kumar et al. | |
| 2004/0064371 A1* | 4/2004 | Crapo | 705/14 |
| 2004/0128345 A1 | 7/2004 | Robinson et al. | |
| 2004/0230484 A1 | 11/2004 | Greenlee | |
| 2004/0260605 A1 | 12/2004 | McIntyre et al. | |
| 2006/0161474 A1* | 7/2006 | Diamond et al. | 705/14 |
| 2008/0040211 A1* | 2/2008 | Walker | G06Q 30/02 705/14.38 |
| 2008/0201232 A1* | 8/2008 | Walker et al. | 705/14 |
| 2010/0145784 A1* | 6/2010 | Sriver | G01C 21/20 705/14.25 |
| 2011/0282972 A1* | 11/2011 | Rosen | G06Q 30/02 709/219 |

\* cited by examiner

SYSTEMS, METHODS AND COMPUTER READABLE MEDIUM FOR WIRELESS SOLICITATIONS

PRIORITY CLAIM

This is a continuation of Application No. 11/003,367, filed Dec. 6, 2004, which is incorporated herein by reference in its entirety.

FIELD OF THE INVENTION

The present invention relates generally to presenting offers to a financial customer, and more particularly to presenting offers that are based on the status of the customer's financial account via a wireless computing device.

BACKGROUND OF THE INVENTION

Credit card products have become so universally well known and ubiquitous that they have fundamentally changed the manner in which financial transactions and dealings are viewed and conducted in society today. Credit card products are most commonly represented by plastic card-like members that are offered and provided to consumers through credit card issuers (such as banks and other financial institutions). With a credit card, an authorized consumer is capable of purchasing services and/or merchandise without an immediate, direct exchange of cash. Instead, the customer incurs debt with each purchase. Thereafter, the customer repays the debt upon receipt of a periodic statement from the issuer. When using the credit card to make a purchase, the transaction is processed via a credit card clearinghouse or authorization system, such as the Visa or MasterCard networks.

In addition to credit cards, there are other financial account cards that function like credit cards, but that are associated with a bank account, like a checking account. Such cards are sometimes called check cards. Like credit card purchases, transactions made by using check cards are cleared through a credit card clearinghouse. Debit cards are another type of financial account cards. Debit cards are also ordinarily associated with a bank account of some type. A common type of debit card is the automated teller machine ("ATM") type card. There are also other types of payment cards, such as stored value cards, smart cards, secured cards, where a customer may pay a security deposit before being given the ability to leverage the credit product, and prepaid credit products, where a credit balance is created via pre-payment and then utilized as point of sale locations.

Credit card issuers and other payment system operators collect a large amount of customer data, some of which is obtained from customers directly. To apply for a credit card, for example, an applicant typically must supply demographic data (e.g. age or city of residence), financial data (e.g., monthly expenses, income, or bank account balance), and employment data (e.g., salary or length of employment). To determine whether to issue a card to the applicant, an issuer may also contact a credit reporting agency to obtain the applicant's credit history.

Payment system operators also collect a great deal of data through the course of a purchase transaction. For example, when a customer makes a purchase, a payment system operator (which may also be the credit card issuer), obtains data about where the purchase was made (e.g., the store name and location), the purchase price, and potentially the item or items purchased. The data collected by the payment system operator is then used to generate billing statements and collect payment from customers.

To date, however, the customer and transaction data collected by the financial account issuer has not been used effectively to provide offers for additional products and services to the customer to encourage the customer to use the account more often. Furthermore, while previous issuer systems may have offered different products and services to a customer, these systems had many deficiencies. First, these offers typically came through standard mail in the form of a coupon or advertisement from the financial account issuer. Customers often discard such mailings because they are usually not timely (e.g., when the customer was actually shopping). Second, these offers are not tied to any customer data or purchase transaction data collected by the financial account issuer. The offers are thus generic to everyone, and not specific to the customer. Additionally, due to the latency between the time the offer is made and when the customer receives the offer, the customer's account status and/or needs may have changed. By the time the customer receives the offer, the customer may have exceeded the credit limit and may no longer be eligible for that offer. Therefore, financial services companies are limited in the products they offer due to the lag associated with delivering offers through standard postal mail. There is thus a need for systems and methods to provide offers for products and services based on previously collected customer data.

SUMMARY OF THE INVENTION

Consistent with the present invention, product offering systems are provided. In one embodiment, a method of sending an offer to a customer of a financial account in a financial institution comprises receiving information identifying a wireless computing device of the customer, monitoring the location of the customer based on the identified wireless computing device of the customer, monitoring a status of the financial account of the customer, determining whether to send the offer to the customer based on the monitored location and account status of the customer, and sending the offer to the customer via the customer's wireless computing device based on a determination to send the offer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general summary and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Systems and methods consistent with the principles of the invention may send offers to customers wirelessly via a wireless computing device. As used herein, the term "offer" can be for either a product or a service. The system may, for example, determine a customer's location, such as whether the customer is at or near a merchant location or the location of a competitor of that merchant. Based on the determination of the customer's location, as well as the status of the customer's account, systems consistent with the invention may determine to send to the customer an offer related to making a purchase at the merchant location.

Figure 1A:
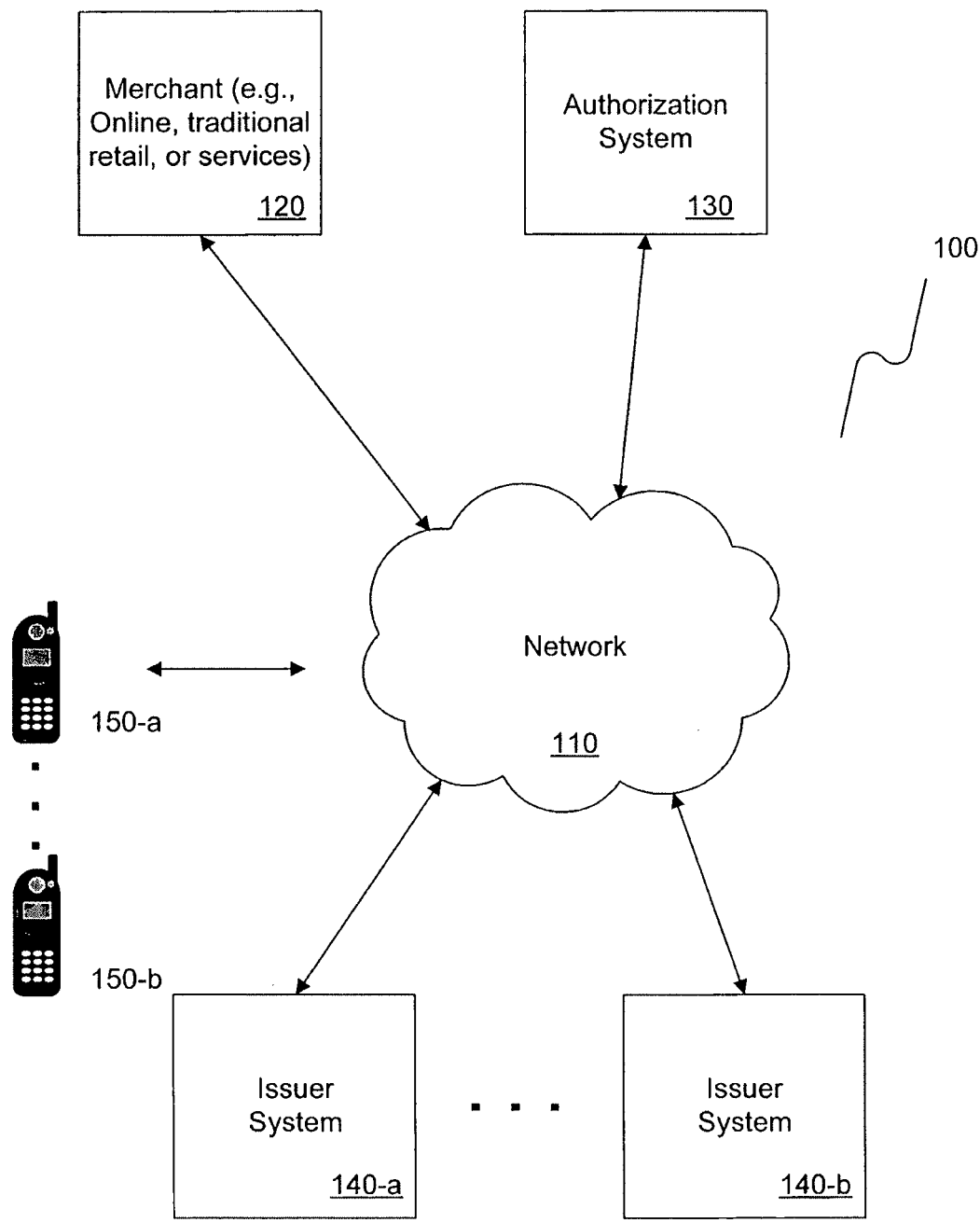
FIG. 1A illustrates an exemplary block diagram of a product offering system, consistent with the present invention.

FIG. 1A illustrates an exemplary block diagram of a product offering system 100 consistent with the present invention. As shown in FIG. 1A, system 100 may include, for example, a merchant 120, an authorization system 130, one or more issuer systems 140, and one or more wireless computing devices 150, each communicating with a network 110. Merchant 120 may be connected via network 110 to authorization system 130. Issuer systems 140-a and 140-b may also be connected to merchant 120 and authorization system 130 via network 110. Although two exemplary issuer systems are shown in FIG. 1A, system 100 may have one or more issuer systems.

Network 110 may comprise any type of computer networking arrangement used to exchange data. For example, network 110 may be the Internet, a private data network, or a virtual private network using a public network such as the Internet. Network 110 may also include a public switched telephone network (PSTN) and/or a wireless network. Merchant 120 may represent any number of merchants that provide goods or services in exchange for payment via a particular payment system. While the present invention may be particularly applicable to a traditional brick-and-mortar retail merchant, merchant 120 may be any type of merchant, such as an online retail merchant. Each merchant 120 may communicate directly or indirectly with authorization system 130 in order to initiate the process of obtaining payment. Authorization system 130 may, for example, include the Visa or Master Card networks and/or any other clearinghouse for approval of purchase transactions. One or more wireless computing devices 150-a and 150-b may also be connected to network 110. Wireless computing devices 150-a and 150-b may be any data processing or communication device, such as a cellular phone, text messaging device, an instant messaging device, a video messaging device, an audio messaging device, a wireless access device, a wearable computer, a tablet computer, a pager, and/or a personal digital assistant. Further, while FIG. 1A shows one network 110 connecting components 120 to 150, system 100 may include multiple types of networks. For example, wireless computing devices 150 may be connected to a wireless network, such as a cellular telephone network, while merchant 120 may be connected to the PSTN or the Internet.

Figure 1B:
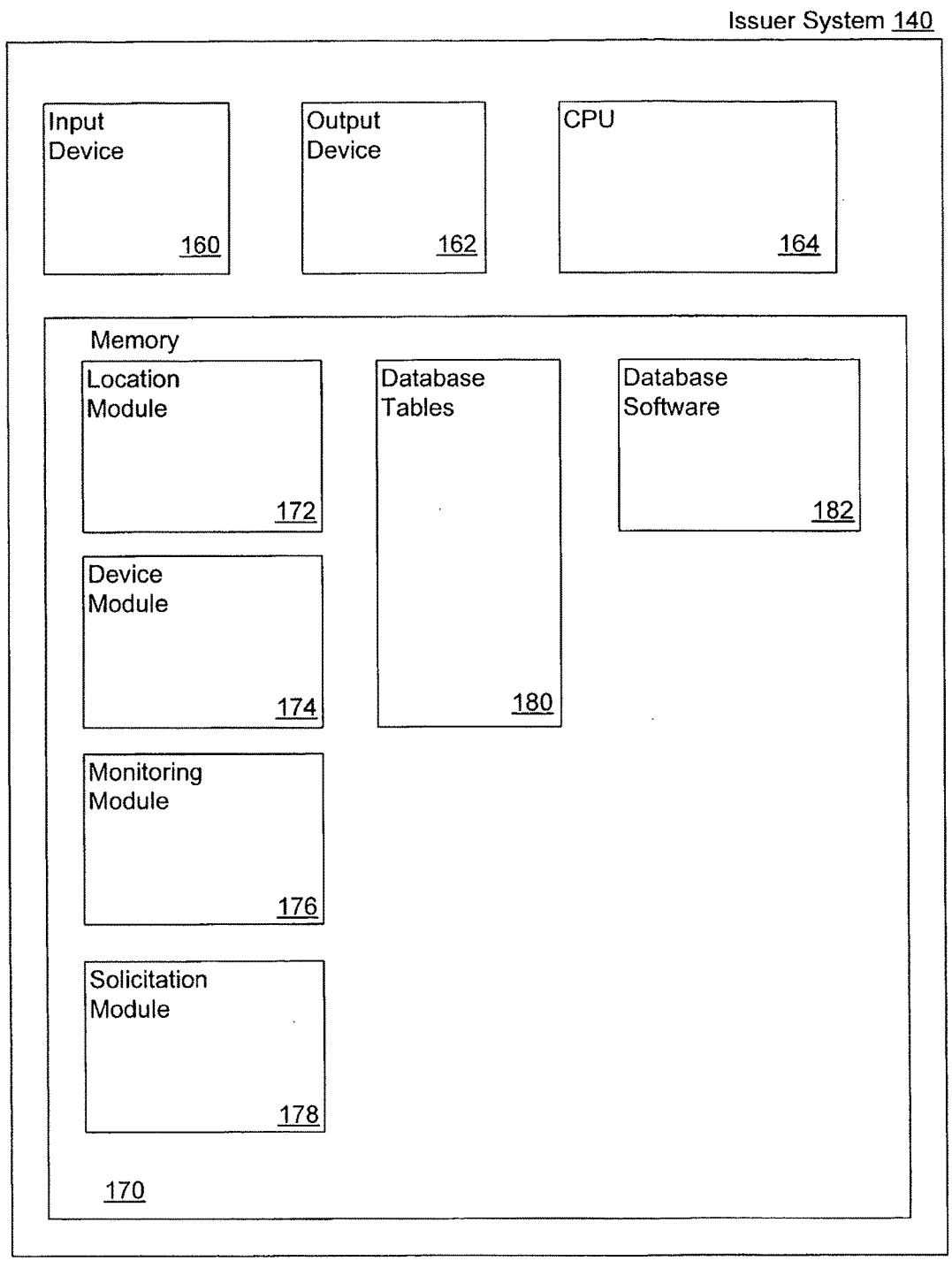
FIG. 1B illustrates an exemplary issuer system, consistent with the present invention.

FIG. 1B is a block diagram illustrating an exemplary issuer system 140, consistent with the present invention. Issuer system 140 may be any general-purpose computing system, such as a mainframe computer, a multi-processor UNIX system, or a powerful PC server system. In any case, such a system may have at least one input device, such as an input device 160. Possible input devices include network interfaces, keyboards, mice, speech recognition devices, or document, video, or image input devices. Additionally, issuer system 140 may have at least one output device 162, such as for example, display devices, network interfaces, printers, or sound or speech output devices.

As illustrated in FIG. 1B, issuer system 140 may also include at least one central processing unit ("CPU") 164. CPU 164 may execute software programs for implementing the processes described below with respect to FIGS. 2-3D. One skilled in the art will appreciate that while FIG. 1B shows one CPU, multiple CPUs may be used to execute the aforementioned software programs. These software programs may reside in memory 170 of issuer system 140.

Memory 170 may include database tables 180 comprising customer account records and merchant records, and software 182 for manipulating the records of database tables 180. Customer records in database tables 180 may include data obtained from several different sources. For instance, customer records in database tables 180 may include account data and location data. An issuer may obtain account data during, for example, the account application process. Such account data may include, for example, the customer's name, billing address, telephone number, and/or Social Security number, and other relevant data of the customer. Account data may also include data from credit bureaus and credit agencies regarding other financial accounts a customer holds, a customer's credit rating, credit history, and may further include a customer's list of assets, liability credit ratings, employment history, insurance history, and medical history. Account data may also include data associated with any purchase transactions between the customer and a merchant 120.

The customer records in database tables 180 may further include location data about the customer, such as postal code data, zip code data (Zip+4, Zip+2 and other similar data), address data, GPS data, longitude/latitude data, and other global positioning data that might be useful in determining the location of a customer. This information may be continuously updated or monitored based upon location data received via a customer's wireless device 150.

The merchant records in database tables 180 may include data about a merchant 120 obtained from several different sources. Such merchant data may include, for example, the merchant name, merchant type, and other relevant data about the merchant. Merchant records stored in database tables 180 may also include a list of competitors for each merchant. Merchant records may also include geographic data about the merchant and each competitor, such as the merchant postal code data, zip code data, address data, GPS data, longitude/latitude data, and other global positioning data that a location determination service may find useful in determining the location of a merchant or the competitor.

In one embodiment, software 182 may interact with various modules (described below) stored in memory 170 to process records stored in database tables 180. Thus, for example, software 182 may be relational database software which may interface with any software module or program that may query, or sort the customer records stored in database tables 180. One skilled in the art will appreciate that any object oriented techniques or other computational techniques may also be used consistent with the present invention to manipulate records stored in database tables 180. Indeed, based on object oriented techniques, records stored in database tables 180 may be represented as objects and may not be stored as part of any table. In other words, database tables 180 and software 182 are merely exemplary, and records, or equivalents thereof, may be processed using other known computing techniques and arrangements.

One skilled in the art will appreciate that the data of database tables 180 and the processes implemented by software 182 may be combined or distributed in any manner consistent with the present invention. Indeed, database tables 180 and database software 182 may be stored in any combination of memories, such as those located in a distributed computing network, and thus need not be located on the same computer system.

Memory 170 may further include a location module 172, a device module 174, a monitoring module 176, and a solicitation module 178. These modules when executed by CPU 164 for example, provide the functionality associated with the flow charts of FIGS. 2 to 3D, discussed in greater detail below. Each of these modules may be implemented in software, firmware, hardware, or any combination thereof. Further, although FIG. 1B shows four different modules, the modules may be combined in any fashion and may be located on the same system or implemented across a distributed computing system.

In one embodiment described below, issuer system 140 may use location module 172 to determine a location of a particular wireless computing device 150 or a customer's financial account card (not pictured) by using different location based services, such as Global Position Systems (GPS), Radio Frequency Identification (RFID), Infrared (IR), Bluetooth, Zig Beg, and/or Triangulation. Each of these services may require the customer to configure the wireless computing device 150 for the service, or the merchant to configure the merchant location for the service. For example, a customer may need to imbed a Bluetooth chip into the customer's wireless computing device 150 for location module 172 to determine the location of the wireless computing device 150. In another example, if a customer's financial account card or wireless computing device 150 has an embedded RFID chip, scanners within a merchant location may require an RFID detector to detect the RFID chip before location module 172 can locate device 150 or the customer's account card. In a further example, when device 150 is a cellular telephone, location module 172 may use a cellular telephone network to determine the location of device 150. In yet another example, location module 172 may use GPS technology and the known latitude and longitude of merchant locations to determine if a customer is close enough to a merchant location to trigger an opportunity for an offer, as will be described in greater detail with regard to FIGS. 3A-3D. One skilled in the art would appreciate that location module 172 may use other location based services, and the present invention is not limited to using the ones specified above.

Location module 172 may, alone or in combination with the other software, determine a location of a particular wireless computing device or a location of a customer. Device module 174 may, alone or in combination with the other software, register one or more wireless computing devices for a customer. Monitoring module 176 may, alone or in combination with the other software, monitor a customer's account and/or a customer's location. Solicitation module 178 may, alone or in combination with the other software, send an offer for a product or a service to a customer's wireless computing device. Module 178 may send the offer in many different forms as will be described in detail below with respect to FIGS. 2-3D.

Figure 2:
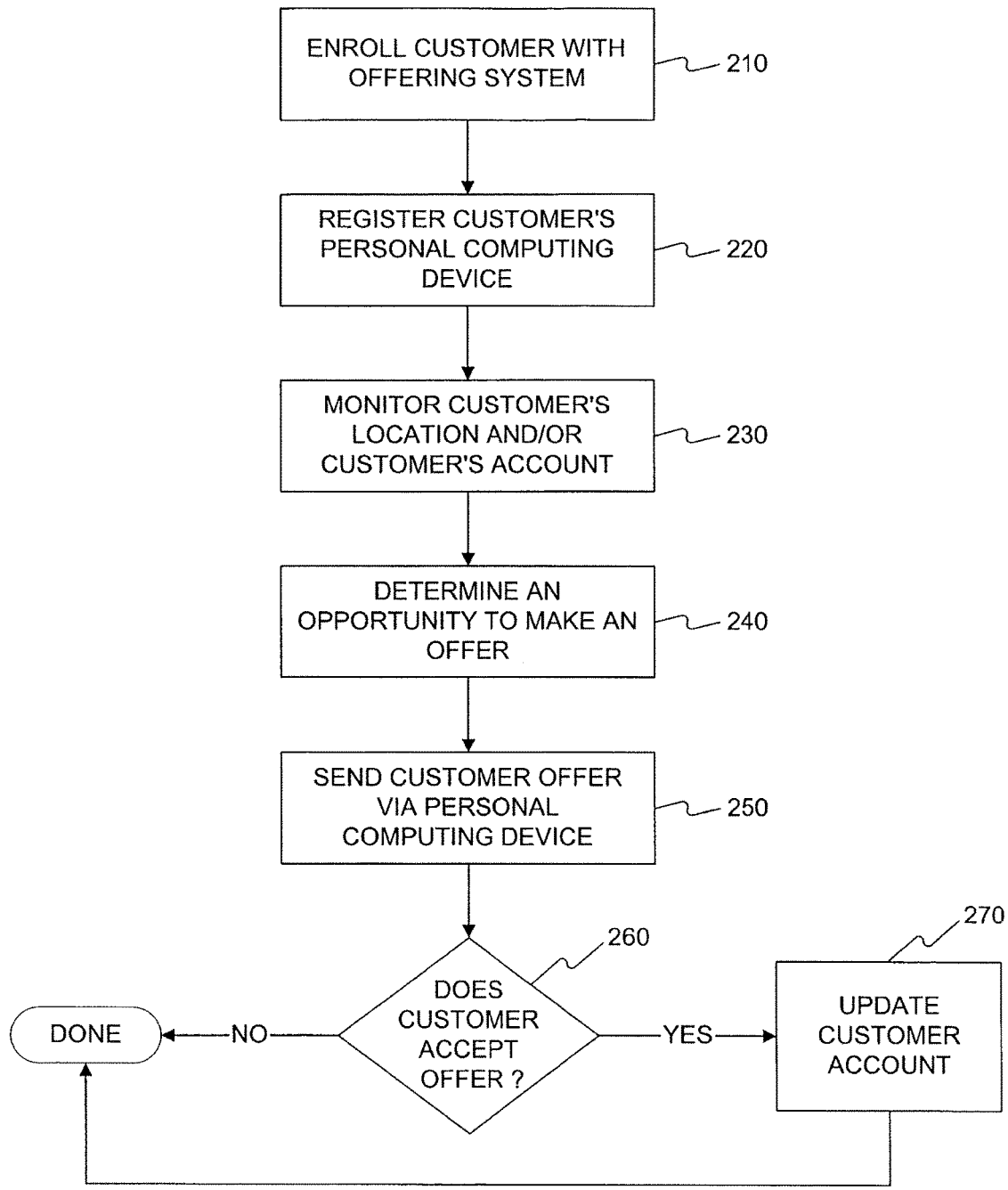
FIG. 2 is a flow chart illustrating an exemplary method for providing offers to a customer, consistent with the present invention.

FIG. 2 is a flow chart that illustrates an exemplary method for providing offers to a customer, consistent with the present invention. As shown in FIG. 2, a product offering system 100 consistent with the present invention may first send a customer, for example a credit card customer, an offer to enroll in a product offering service, through which the customer may receive wireless offers for products and services based on the customer's location and/or financial account status (stage 210). Although the embodiments described below are with respect to a credit card account, one skilled in the art would appreciate that any financial account may be used, such as, for example, a checking account or savings account. One skilled in the art would also appreciate that any financial account card may be used, such as, for example, a debit card or a bank card associated with any financial account.

The enrolled customer may then receive offers for products and services wirelessly via the customer's wireless computing device 150. Examples of these offers may include, but are not limited to: an offer to buy a financial product, various credit offerings based on different financial accounts, insurance offerings, lending and loan products, financial and brokerage services, banking and banking related products, revolving credit products, secured debt products, sales discounts, and annuities. A person skilled in the art would appreciate that the list of offers for products and services is not limited to the ones mentioned above, and other offers whether the offers are based on a customer's financial account or based on other products and services, are available. Offers may also come in many different forms. For example, an offer may come in the form of a digital coupon for a sales discount, an email, a text message, a voice mail, or a phone call.

If the customer enrolls with system 100, the customer may then register one or more wireless computing devices 150*a*-150*b* with system 100 (stage 220). In this regard, device module 174 may, alone or in combination with other software, register one or more wireless computing devices for each customer record in database tables 180. Issuer system 140 may store data about the customer's wireless computing device 150 in the customer's record in database tables 180 for subsequent use when contacting the customer. For example, if the customer registers a cellular phone, issuer system 140 may store the cellular phone number of the customer in the customer record in database tables 180.

Further, while the exemplary embodiment of FIG. 2 illustrates an enrollment stage, systems consistent with the present invention may not require the customer to enroll with system 100. In such cases, system 100 may register a customer's wireless computing device 150 without requiring the customer to actively register the device as part of stage 220. For instance, system 100 may obtain information about a customer's wireless device 150 from a third party, such as a cellular phone service provider.

In any event, once any wireless computing devices 150a-150b are registered with issuer system 140, monitoring module 176 may monitor the customer's account and/or the customer's location (stage 230). For example, monitoring module 176 may monitor the transaction activity, credit limit, credit rating, account status history and/or account status type of a customer. Monitoring module 176 may use any suitable software/hardware or computational device to asses the customer records to monitor the various aspects of a customer's account. For example, monitoring module 176 may monitor the customer's account by using an SQL query on each of the created customer records based on whether a particular customer is within a predetermined amount of his or her credit limit.

Monitoring module 176 may also monitor a customer's location. Monitoring module 176 may monitor the customer's location by using location module 172 to determine the location of the registered wireless computing device 150. For example, location module 172 may use GPS technology to locate a customer's cellular phone and module 172 may use known GPS information about merchants to determine the customer is driving by a car dealership. Monitoring module 176 may thus monitor the location information from module 172 for use to determine whether a customer's location meets predetermined criteria, described in greater detail below, for generating an offer.

In another embodiment, a customer may notify issuer system 140 when he or she is at a merchant location using the wireless computing device 150. For example, if a customer enters a home improvement store, the customer may notify issuer system 140 of his or her location by sending an email to issuer system 140 using a personal digital assistant. In yet another embodiment, monitoring module 176 may monitor account activity of a customer to determine the location of the customer. For example, if a customer's account activity reflects the customer has shopped at a specific merchant twice in one day, module 176 may determine the customer is still near that specific merchant.

Based on the monitoring stage (230), issuer system 140 may determine different opportunities to make offers for various products and services to a customer (stage 240). FIGS. 3A-3D, described below, illustrate exemplary solicitation opportunities in detail. System 140 (e.g., monitoring module 176 and/or solicitation module 178) may use various statistical modeling tools for monitoring and/or predicting customer behaviors and for determining the different opportunities for making offers. Such modeling tools, such as those offered by Unica and Protaganna, are well known to those of ordinary skill in the art. System 140 may use these tools to facilitate the simulation and analysis of the expected outcomes of various models that system 140 may use to either mitigate risk and/or maximize profit potential. System 140 may use raw data (e.g. potential or existing customer names, account information, etc.) through the models (which have predetermined segmentation points based on risk/profit profiles) to create target populations or sales opportunities. Once target populations are identified, the modeling tools may establish triggers to initiate the product offering. Triggers may include: predetermined locations, predetermined credit limits, dates, rewards activities, previous customer behavior, forecasted customer behavior, and significant life events (birthdays). As note above, exemplary implementations of how system 100 may determine an opportunity to make an offer to a customer are described in greater detail below with respect to FIGS. 3A-3D.

Once issuer system 140 determines one or more opportunities for a customer, solicitation module 178 may, alone or in combination with other software, send the customer a unique offer via the customer's wireless computing device 150a registered earlier in stage 220 (stage 250). This offer may be in any of several forms. For example, solicitation module 178 may send the offer for a product as a text message to the customer's registered cellular phone or personal digital assistant.

Solicitation module 178 may, alone or in combination with other software, utilize various services to send the offer to the customer through his wireless computing device 150. Solicitation module 178 may transmit an offer using, for example, one or more of the following: Short Message Service (SMS), Wireless Application Protocol (WAP), JAVA and Java 2 Platform, Micro Edition (J2ME) offered by Sun, BREW services offered through Qualcomm, Enhanced Messaging Service (EMS), Multimedia Message Service (MMS), or HTTP. Each of these various services may require the customer to configure the wireless computing device 150 for the service. For example, a customer may need to first configure a cellular phone to allow receipt of text messages.

Each of these various services may also require a participating merchant to configure the merchant for the service. For example, a merchant may need to be equipped for detection of IR, Bluetooth or other types of wireless communications, or may need RFID detectors to detect a customer's credit card that may have an imbedded RFID chip.

Solicitation module 178 may also send the offer to a cellular phone in the form of a voice mail. Module 178 may also send an email to a customer's email account, or send a text message to the customer's cellular phone or personal digital assistant. One skilled in the art would appreciate that solicitation module 178 may use other services to send offers to customers via each customer's wireless computing device 150, and the present invention is not limited to the examples listed.

Once a customer receives the one or more offers sent by solicitation module 178, the customer may accept the offer (stage 260). A customer may accept the offer in a number of ways. A customer may, for example, reply to a text message sent to the customer's wireless computing device 150 indicating acceptance of the offer, or a customer may indicate acceptance by downloading the offer to wireless computing device 150 when the offer is a digital coupon. A customer may also accept the offer by contacting issuer system 140 by telephone or email. A customer may also accept the offer by simply using the offer with a merchant. Depending on the type of offer sent and whether the customer accepts the offer, as will be described in greater detail with respect to FIGS. 3A-3D, issuer system 140 may update the customer account data of the customer (stage 270).

Figure 3A:
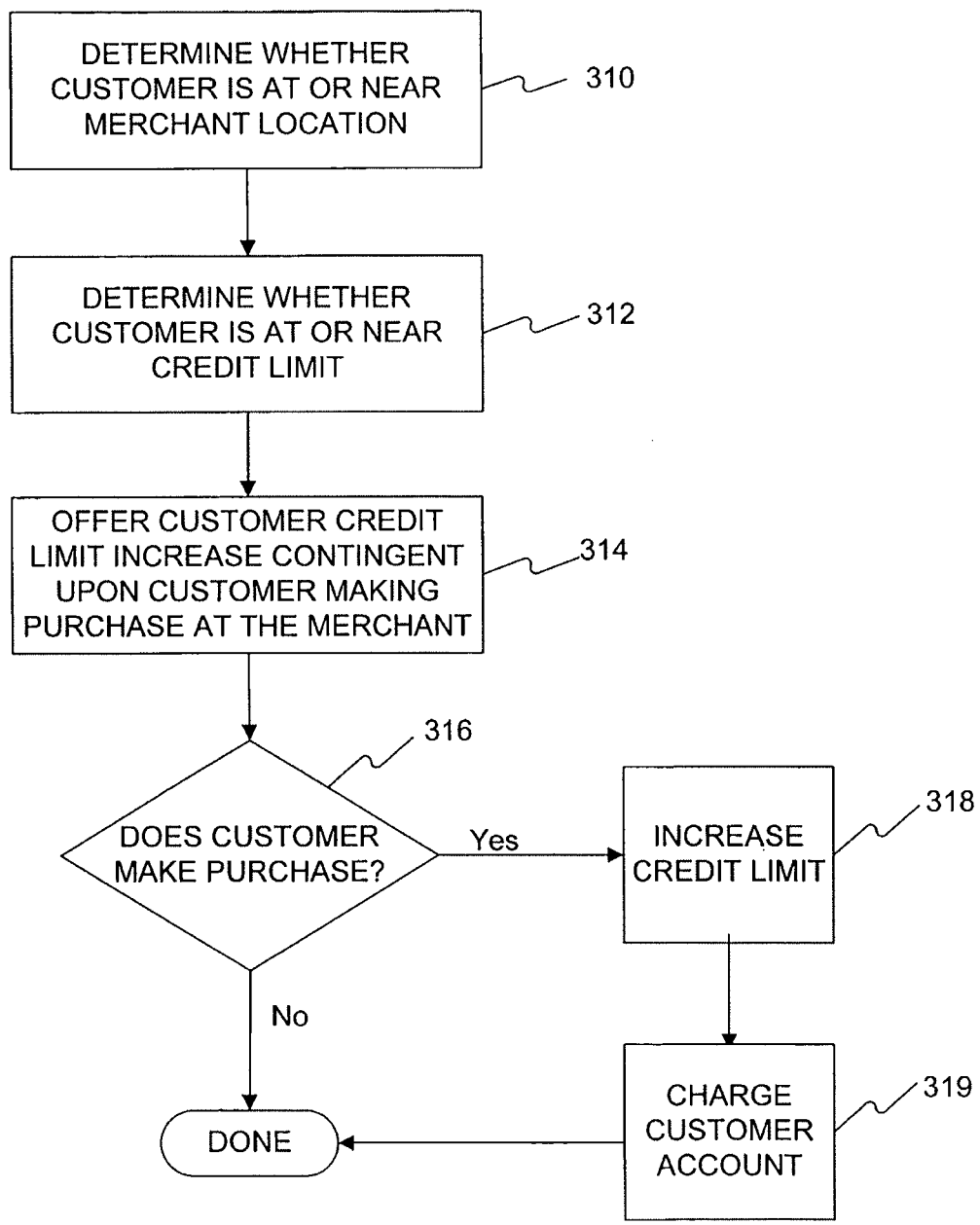
FIG. 3A is a flowchart illustrating an exemplary process for determining an opportunity to make a customer offer, consistent with the present invention.

FIG. 3A is a flowchart illustrating an exemplary process for determining an opportunity to make a customer offer, as described above with respect to stages 230-270 of FIG. 2, consistent with the present invention. Location module 172, alone or in combination with monitoring module 176, may first determine whether a customer is at or near a merchant location (stage 310). Location module 172 may, alone or in combination with other software, use any one of the location based services described above to determine the location of the customer. For example, location module 172 may determine that a customer is at a particular merchant location because an RFID sensor in the merchant location detected an RFID chip embedded in a customer's credit card or cellular phone.

Once location module 172 has detected the presence of a customer at or near a merchant location, monitoring module 176 may then determine if a customer is at or near a credit limit for a particular credit card account (stage 312). Monitoring module 176 may, alone or in combination with other software, monitor the credit limit of a customer to determine if the customer is eligible for a credit limit increase. Monitoring module 176 may also monitor other customer account attributes, for example, the credit rating of the customer in determining whether the customer is eligible for a credit limit increase. Depending on the monitoring of the account attributes, issuer system 140 may offer the customer a credit limit increase contingent upon the customer making a purchase at the merchant (stage 314). Solicitation module 178 may send the customer the offer for the credit limit increase by sending the terms and conditions to the customer's personal digital assistant. Solicitation module 178 may send the offer to the customer in any one of the methods described above with respect to FIG. 2. Once the customer meets the purchase requirements described in the offer, issuer system 140 may then increase the customer's credit limit (stage 318). Issuer system 140 may then charge the customer's account for the purchase (stage 319).

As an example, location module 172 may determine a customer is within a predetermined distance, e.g., fifty feet, of an electronics store. Based on this determination, monitoring module 176 may then initiate a look up procedure in the customer records in database 180 for the customer's existing credit limit, credit rating, risk, and/or information about the merchant to determine whether the customer is qualified for a credit limit increase. Issuer system 140 may then offer the customer a credit limit increase contingent upon the customer making any purchase at the electronics store. Issuer system 140 may put various conditions on the purchase, for example, a minimum purchase amount. Solicitation module 178 may then send the customer this offer via the customer's personal digital assistant. The customer may then accept the offer by making the purchase described in the offer sent by solicitation module 178. Issuer system 140 may then update the credit limit of the customer in the customer records stored in database tables 180, and may also charge the customer's account for the purchase. Such an exemplary embodiment is advantageous to the customer since it allows the customer to make a purchase at the merchant, which the customer could not otherwise make without the credit limit increase.

Further, while FIG. 3A illustrates that the credit limit increase is performed after making the purchase, system 100 may increase the credit limit before the customer makes the purchase or as part of the purchase transaction.

Figure 3B:
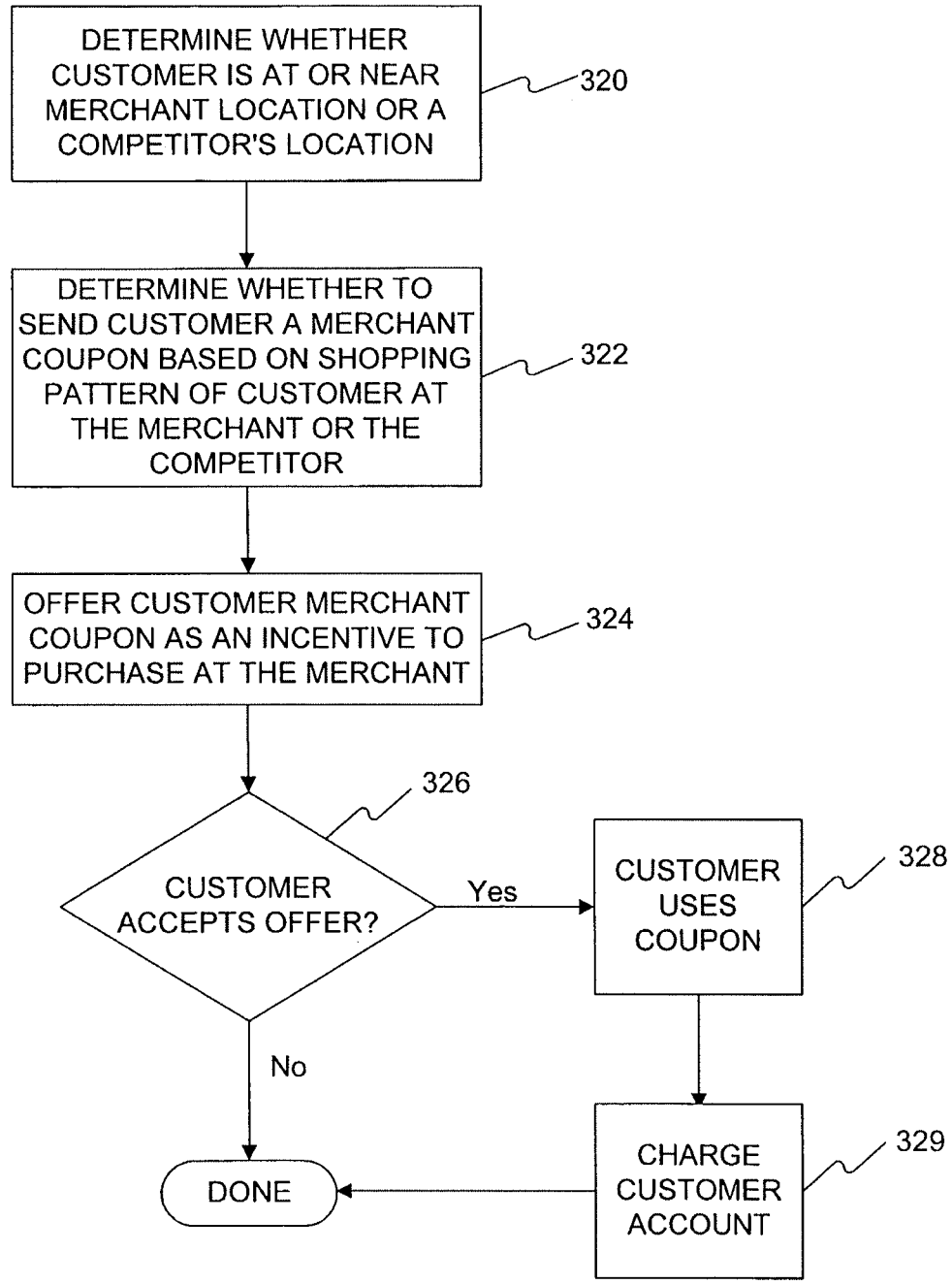
FIG. 3B is a flowchart illustrating a second exemplary process for determining an opportunity to make a customer offer, consistent with the present invention.

FIG. 3B is a flowchart illustrating a second exemplary process for determining an opportunity to make a customer offer, as described above with respect to stages 230-270 of FIG. 2, consistent with the present invention. Location module 172 may first determine whether a customer is at or near a merchant location or a competitor's location (stage 320). As described above, location module 172 and/or monitor module 176 may, alone or in combination with other software, monitor the customer through any one of the location based services described above to determine the location of the customer. Once system 140 has detected the presence of a customer at or near a merchant location, monitoring module 176 may determine whether to send the customer a merchant coupon based on a specific shopping pattern of the customer at the merchant or a competitor (stage 322).

For instance, monitoring module 176 may determine a customer typically shops at a particular merchant once a week. In such a case, module 176 may determine that a pattern exists in the customer's shopping habits. Module 176 may subsequently determine an inconsistency in this shopping pattern, such as, for example, that a period of time has passed without the customer making any purchases at the particular merchant. Issuer system 140 may then offer the customer a coupon as an incentive to purchase at the particular merchant (stage 324). For example, if monitoring module 176 determines that a customer shops at a particular electronics merchant once a week, and the customer in the past two weeks has not bought anything at the merchant, issuer system 140 may determine to send the customer a coupon for that merchant. Solicitation module 178 may send the offer to the customer in any one of the methods described above with respect to FIG. 2. This coupon may be in a form of a digital coupon and may be sent to the customer's personal computing device 150.

In another example, monitoring module 176 may determine a customer shops at a particular merchant twice a week. In such a case, if location module 172 detects the customer is near a competitor, issuer system 140 may then offer the customer a coupon to purchase at the particular merchant as an incentive to purchase at the particular merchant and not the competitor.

The customer may accept the offer (stage 326) by using the offer, in this case, the digital coupon (stage 328). Those skilled in the art would appreciate that issuer system 140 may make the offer in different forms, and that the offer is not limited to a digital coupon. Issuer system 140 may then charge the customer account for the total amount of the purchase (stage 329).

Figure 3C:
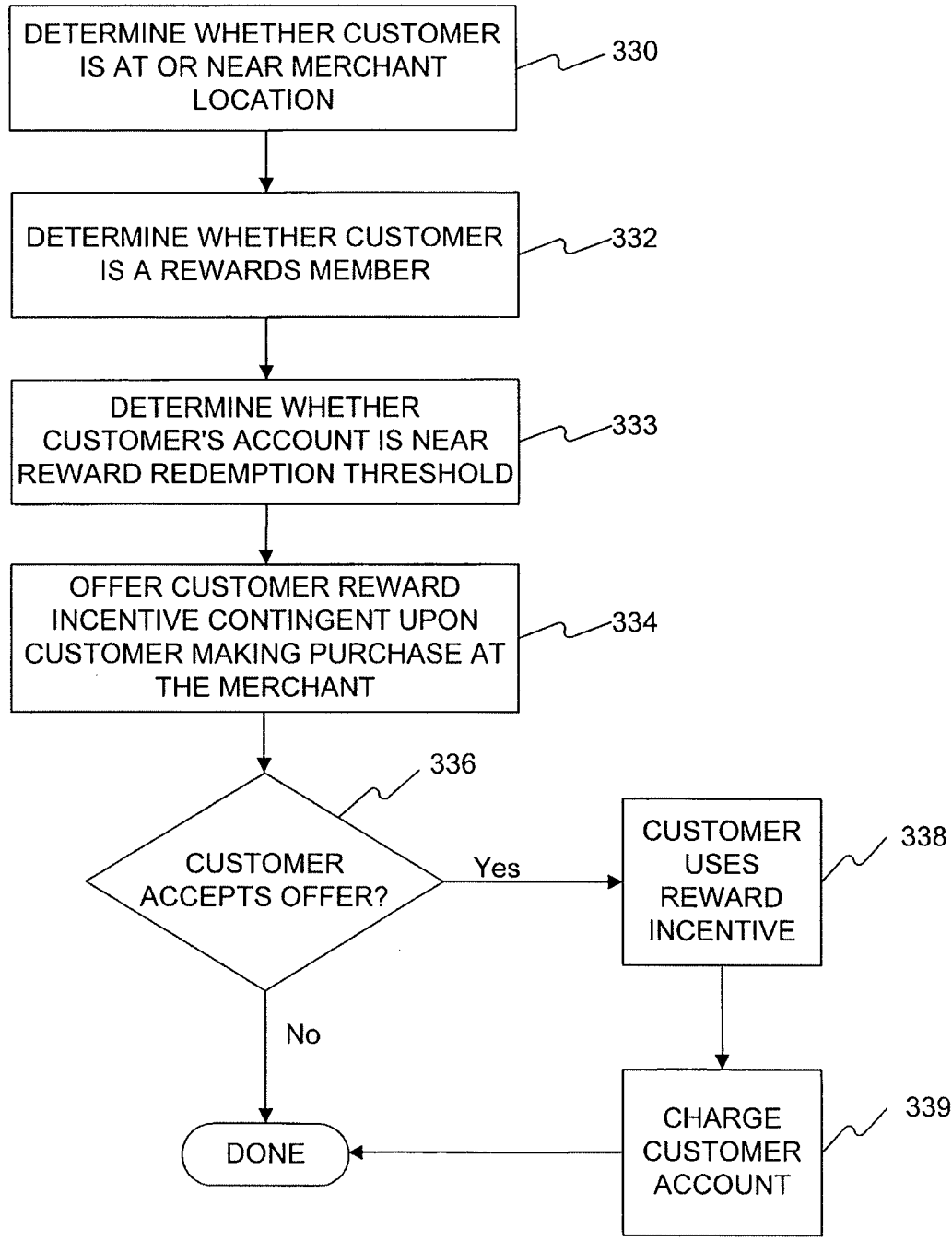
FIG. 3C is a flowchart illustrating a third exemplary process for determining an opportunity to make a customer offer, consistent with the present invention.

FIG. 3C is a flowchart illustrating a third exemplary process for determining an opportunity to make a customer offer, as described above with respect to stages 230-270 of FIG. 2, consistent with the present invention. Location module 172 may first determine whether a customer is at or near a merchant location (stage 330). As described above, location module 172 and/or monitoring module 176 may, alone or in combination with other software, monitor the customer through any one of the location based services described above and determine the location of the customer. Monitoring module 176 may then determine whether a customer is a rewards member (stage 332). A rewards member is a customer that may be eligible for certain rewards based on the amount of purchase transactions or other types of transactions made using the account. For example, a rewards member may have to spend $5000 a month in order to get a free product. If a customer is a rewards member, monitoring module 176 may monitor the customer's transactions to determine that the customer is at or near a reward threshold level (stage 333). For example, monitoring module 176 may determine that the customer's account has accumulated $4900 in purchase transactions, and that the reward threshold is $5000. Issuer system 140 may offer the customer a reward incentive that would allow the customer to reach the award threshold contingent upon a purchase at the merchant (stage 334). Solicitation module 178 may send the offer to the customer in any one of the methods described above with respect to FIG. 2. For example, the reward incentive may be a coupon stating if the customer makes a purchase of at least $50, issuer system 140 may credit the customer's rewards account for double the amount spent. For example, if the customer purchased an item for $50, issuer system 140 may credit the customer's rewards account for $100, which will then allow the customer to reach the award redemption threshold of $5000. The customer may accept the offer and use the reward incentive (stages 336 and 338). Issuer system 140 may charge the customer's account for the product purchased (stage 339).

Figure 3D:
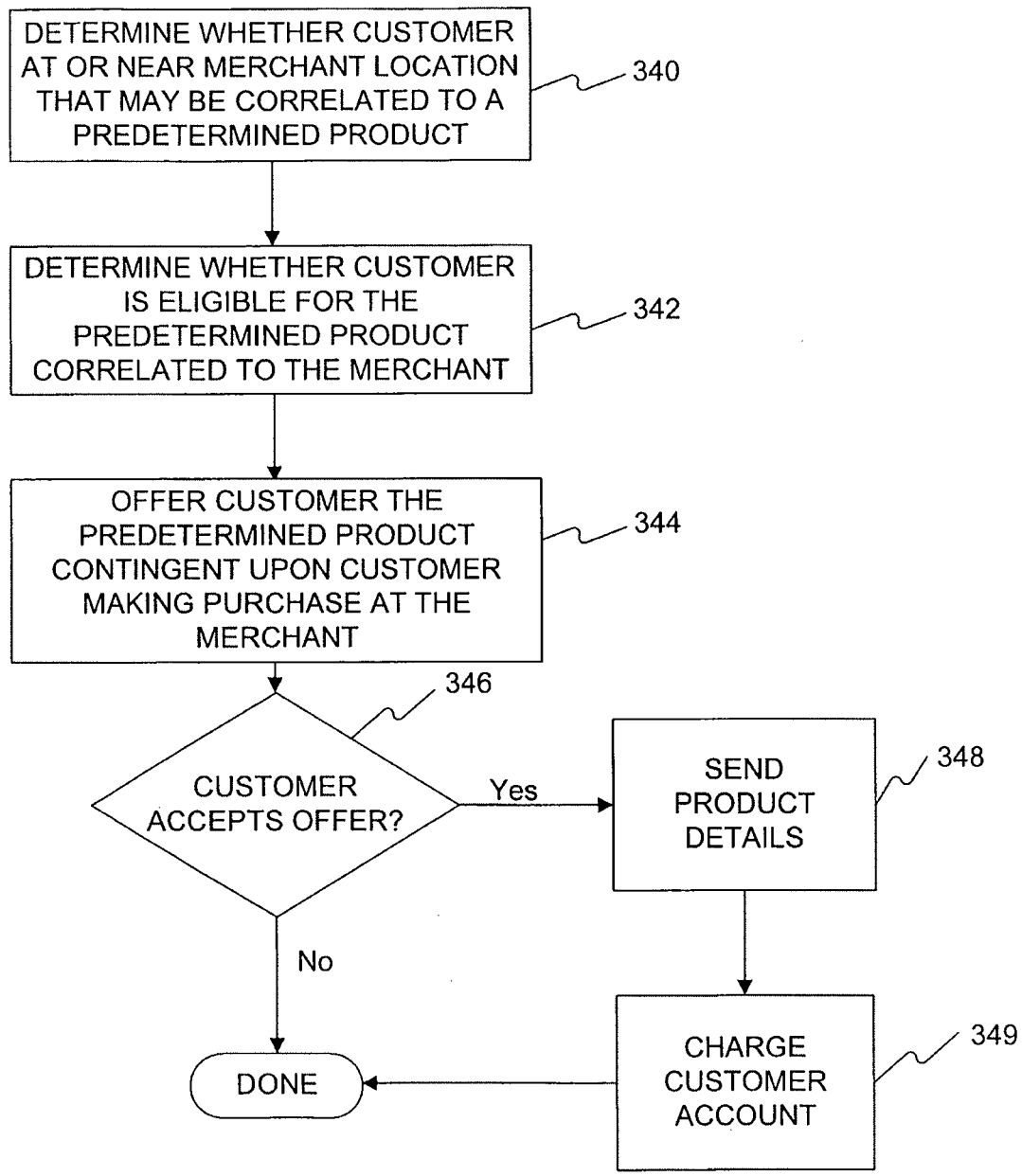
FIG. 3D is a flowchart illustrating a fourth exemplary process for determining an opportunity to make a customer offer, consistent with the present invention.

FIG. 3D is a flowchart illustrating a fourth exemplary process for determining an opportunity to make a customer offer, as described above with respect to stages 230-270 of FIG. 2, consistent with the present invention. Location module 172 may first determine whether a customer is at or near a merchant location that issuer system 140 may correlate to a predetermined product (stage 340). As described above, location module 172 and/or monitoring module 176 may, alone or in combination with other software, monitor the customer through any one of the location based services described above and determine the location of the customer.

Once issuer system 140 determines a customer is at or near a merchant location, system 140 may then determine whether the merchant may be correlated to the predetermined product. In this regard, system 140 may determine that customer segments for certain products are correlated to customer segments for certain merchants. For example, issuer system 140 may correlate a home improvement store to a home equity loan or a new home mortgage. These merchant-product correlations may be stored in database tables 180. Monitoring module 176 may then determine whether the customer is eligible for the product correlated to the merchant (stage 342). Module 176 may determine the customer is eligible based on various aspects of the customer's account. For example, module 176 may determine from the customer's data in database tables 180 that the customer does not currently have a home loan and the customer's salary and credit history indicate the customer is eligible for the loan. Issuer system 140 may then offer the customer the product contingent upon the customer making a purchase at the merchant (stage 344). Issuer system 140 may set an expiration date on the offer, such as that the customer may have one week to use the offer. One skilled in the art would appreciate that issuer system 140 may offer other correlated products and the present invention is not limited to the above examples. Solicitation module 178 may send the offer to the customer in any one of the methods described above with respect to FIG. 2.

After solicitation module 178 sends the offer, the customer may then accept the offer in any one of the ways described above with respect to stage FIG. 2 (stage 346). For example, if the message was sent by solicitation module 178 as a text message to the customer's cellular phone, the customer may accept the offer by sending a text message back to issuer system 140. The customer may also accept the terms of the offer by making the purchase specified in the offer. Issuer system 140 may then send to the customer terms and conditions for the offer, either via the same route that the offer was initially sent (stage 250) or through other means such as direct mail (stage 348). Terms and conditions for the offer may be, for example, specific terms and conditions of a home mortgage loan. Issuer system 140 may then charge the customer's account for the purchase at the merchant (stage 349).

While FIGS. 3A-3D illustrate exemplary processes for determining an opportunity to make a customer offer, issuer systems 140 consistent with the invention may send offers in other scenarios as well. For example, systems consistent with the invention allow issuer 140 to send offers in real-time. Based on customer behavior (e.g. whether a customer makes a specific purchase or reaches a reward redemption threshold), the customer is issued a coupon, credit, or reward in "real-time" on the personal computing device 150. For example, a real-time coupon may include a discount code displayed on the personal computing device 150 which can be entered into the merchant's system and may only be valid for a few minutes. Further, systems consistent with the invention may send one or more offers to a customer at the same time to the same computing device 150, or to multiple computing devices 150a-150b.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method for providing offers to a customer, the method comprising:
monitoring, by one or more processors, transaction data relating to shopping habits of the customer;
determining, by the one or more processors, a variation in the shopping habits of the customer based on changes in the transaction data, wherein the variation comprises a lack of transaction data pertaining to a merchant during a predetermined period of time;

monitoring, by the one or more processors, a location of the customer based on global positioning data received from a wireless computing device associated with the customer;

determining, by the one or more processors, that a present location of the customer corresponds to a location associated with a competitor of the merchant;

transmitting, over an electronic network, a first offer including a merchant offer code to the wireless computing device associated with the customer based on the determined variation and the determined present location, wherein the first offer comprises an offer to complete a transaction with the merchant within a predetermined expiration time period by entering the merchant offer code displayed on the wireless computing device;

determining, by the one or more processors, that the customer is located within a predetermined distance from the merchant based on the monitored location of the customer;

determining, by the one or more processors, that the customer is a member of a rewards program;

determining, by the one or more processors, that the customer has a rewards level within a proximity of a reward redemption threshold;

generating, by the one or more processors, a second offer associated with the merchant allowing the customer to reach the rewards redemption threshold when a subsequent purchase of a predetermined minimum value is made with a financial account at the merchant, wherein the second offer is a credit applied to a rewards account and the predetermined minimum value is based on the proximity of the reward redemption threshold; and providing the second offer to the customer via the wireless computing device associated with the customer.

2. The method of claim 1, further comprising:
determining a first reward for the customer based on an indication that the customer redeemed the first offer.

3. The method of claim 1, wherein the determining a variation in the shopping habits of the customer further comprises:
determining, by the one or more processors, that the customer regularly made purchase transactions at the merchant; and
determining, by the one or more processors, that the customer has not made a purchase transaction at the merchant within the predetermined period of time.

4. The method of claim 1, wherein the determining a variation in the shopping habits of the customer further comprises:
determining, by the one or more processors, that the customer made a purchase transaction at the merchant; and
determining, by the one or more processors, that the customer has not made a purchase at the merchant within the predetermined period of time.

5. The method of claim 1, further comprising:
determining a second reward for the customer based on an indication that the customer redeemed the second offer.

6. The method of claim 1, wherein the first offer is at least one of a discount, a credit offering, a coupon, or a voucher.

7. The method of claim 1, wherein the providing the first offer further comprises:

providing the first offer as a text message, an email, or a voice mail message to the wireless computing device associated with the customer.

8. The method of claim 1, wherein the monitoring the shopping habits of the customer further comprises:
monitoring a status of a financial account associated with the customer used to make purchases by collecting financial data associated with the financial account.

9. The method of claim 8, wherein the financial data comprises purchase transaction history.

10. A system for providing offers to a customer, the system comprising:
a processor; and
a memory, wherein the memory stores instructions that, when executed by the processor, cause the processor to perform operations comprising:
monitoring transaction data relating to shopping habits of the customer;
determining a variation in the shopping habits of the customer based on changes in the transaction data, wherein the variation comprises a lack of transaction data pertaining to a merchant during a predetermined period of time;
monitoring a location of the customer based on global positioning data received from a wireless computing device associated with the customer;
determining that a present location of the customer corresponds to a location associated with a competitor of the merchant;
transmitting, over an electronic network, the first offer including a merchant offer code to the wireless computing device associated with the customer based on the determined variation and the determined present location,
wherein the first offer comprises an offer to complete a transaction with the merchant within a predetermined expiration time period by entering the merchant offer code displayed on the wireless computing device;
determining that the customer is located within a predetermined distance from the merchant based on the monitored location of the customer;
determining that the customer is a member of a rewards program;
determining that the customer has a rewards level within a proximity of a reward redemption threshold;
generating a second offer associated with the merchant allowing the customer to reach the rewards redemption threshold when a subsequent purchase of a predetermined minimum value is made with a financial account at the merchant, wherein the second offer is a credit applied to a rewards account and the predetermined minimum value is based on the proximity of the reward redemption threshold; and
providing the second offer to the customer via the wireless computing device associated with the customer.

11. The system of claim 10, wherein the operations include:
determining a first reward for the customer based on an indication that the customer redeemed the first offer.

12. The system of claim 10, wherein the determining a variation in the shopping habits of the customer comprises:
determining that the customer regularly made purchase transactions at the merchant; and determining that the customer has not made a purchase transaction at the merchant within the predetermined period of time.

13. The system of claim 10, wherein the determining a variation in the shopping habits of the customer comprises:
determining that the customer made a purchase transaction at the merchant; and
determining that the customer has not made a purchase at the merchant within the predetermined period of time.

14. The system of claim 10, wherein the operations comprise:
determining a second reward for the customer based upon an indication that the customer redeemed the second offer.

15. The system of claim 10, wherein the first offer is at least one of a discount, a credit offering, a coupon, or a voucher.

16. The system of claim 10, wherein the operations include:
providing the first offer as a text message, an email, or a voice mail message to the customer's wireless computing device.

17. The system of claim 10, wherein the monitoring the shopping habits of the customer further comprises:
monitoring transaction data relating to a status of a financial account associated with the customer by collecting financial data associated with the financial account.

18. The system of claim 17, wherein the financial data comprises purchase transaction history.

19. A non-transitory computer-readable medium storing instructions for performing, when executed by a processor, a method comprising:
monitoring transaction data relating to shopping habits of a customer;
determining a variation in the shopping habits of the customer based on changes in the transaction data, wherein the variation comprises a lack of transaction data pertaining to a merchant during a predetermined period of time;
monitoring a location of the customer based on a global positioning data received from a wireless computing device associated with the customer;
determining that a present location of the customer corresponds to a location associated with a competitor of the merchant;
transmitting, over an electronic network, the first offer including a merchant offer code to the wireless computing device associated with the customer based on the determined variation and the determined present location,
wherein the first offer comprises an offer to complete a transaction with the merchant within a predetermined expiration time period by entering the merchant offer code displayed on the wireless computing device;
determining that the customer is located within a predetermined distance from the merchant based on the monitored location of the customer;
determining that the customer is a member of a rewards program;
determining that the customer has a rewards level within a proximity of a reward redemption threshold;
generating a second offer associated with the merchant allowing the customer to reach the rewards redemption threshold when a subsequent purchase of a predetermined minimum value is made with a financial account at the merchant, wherein the second offer is a credit applied to a rewards account and the predetermined minimum value is based on the proximity of the reward redemption threshold; and
providing the second offer to the customer via the wireless computing device associated with the customer.

20. The non-transitory computer-readable medium of claim 19, wherein the determining a variation in the shopping habits of the customer comprises:
determining that the customer regularly made purchase transactions at the merchant; and
determining that the customer has not made a purchase transaction at the merchant within the predetermined period of time.

21. The non-transitory computer-readable medium of claim 19, wherein the determining a variation in the shopping habits of the customer comprises:
detecting that the customer made a purchase transaction at a merchant; and
determining that the customer has not made a purchase at the merchant within a predetermined period of time.

* * * * *